United States Patent
Arce et al.

(10) Patent No.: US 11,448,183 B2
(45) Date of Patent: Sep. 20, 2022

(54) WIND TURBINE BLADE COMPRISING A NOISE REDUCING DEVICE

(71) Applicant: LM WIND POWER US TECHNOLOGY APS, Kolding (DK)

(72) Inventors: Carlos Arce, Kolding (DK); Peter Baek, Kolding (DK); Bjarke Van Malkenhorst, Kolding (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 0 days.

(21) Appl. No.: 16/614,633

(22) PCT Filed: May 22, 2018

(86) PCT No.: PCT/EP2018/063379
§ 371 (c)(1),
(2) Date: Nov. 18, 2019

(87) PCT Pub. No.: WO2018/215461
PCT Pub. Date: Nov. 29, 2018

(65) Prior Publication Data
US 2020/0149507 A1  May 14, 2020

(30) Foreign Application Priority Data

May 22, 2017  (EP) .................... 17172212

(51) Int. Cl.
*F03D 1/06* (2006.01)
(52) U.S. Cl.
CPC ........ *F03D 1/0675* (2013.01); *F05B 2240/30* (2013.01); *F05B 2240/3042* (2020.08); *F05B 2240/3062* (2020.08); *F05B 2260/96* (2013.01)

(58) Field of Classification Search
CPC .... F03D 1/0675; F03D 1/0633; F03D 1/0296; F05B 2240/2211
See application file for complete search history.

(56) References Cited

U.S. PATENT DOCUMENTS

| | | | | |
|---|---|---|---|---|
| 9,476,406 B2 * | 10/2016 | Obrecht | ............... | F03D 1/0633 |
| 10,240,576 B2 * | 3/2019 | Drack | ............... | F03D 1/0641 |
| 10,465,652 B2 * | 11/2019 | Wetzel | ............... | F03D 1/0675 |
| 11,220,993 B2 * | 1/2022 | Asheim | ............... | F03D 1/0633 |

(Continued)

FOREIGN PATENT DOCUMENTS

| | | |
|---|---|---|
| WO | 2017039666 A1 | 3/2017 |
| WO | 2017044099 A1 | 3/2017 |

OTHER PUBLICATIONS

Extended European Search Report dated Nov. 22, 2017 corresponding to application No. 17172212.7-1607.

*Primary Examiner* — Woody A Lee, Jr.
*Assistant Examiner* — Wesley Le Fisher
(74) *Attorney, Agent, or Firm* — Nath, Goldberg & Meyer; Jerald L. Meyer; Tanya E. Harkins

(57) ABSTRACT

This invention relates to a noise reducing device and a wind turbine blade comprises such a noise reducing device. The noise reducing device comprises noise reducing elements projecting from a base part towards a second end. Airflow modifying elements projects further from the base part towards a first end. The noise reducing elements and airflow modifying elements are arranged on opposite sides of the base part and preferably have different dimensions and/or shapes.

20 Claims, 5 Drawing Sheets

(56) References Cited

U.S. PATENT DOCUMENTS

| | | | | |
|---|---|---|---|---|
| 2011/0268558 A1* | 11/2011 | Driver | F03D 80/00 | 415/119 |
| 2012/0027590 A1* | 2/2012 | Bonnet | F03D 1/0641 | 416/1 |
| 2013/0164141 A1* | 6/2013 | Lin | F03D 1/0641 | 416/223 R |
| 2014/0072441 A1* | 3/2014 | Asheim | F03D 1/0683 | 416/241 R |
| 2014/0301864 A1* | 10/2014 | Singh | F03D 1/0675 | 416/90 R |
| 2015/0050154 A1* | 2/2015 | Dixon | F03D 1/0675 | 416/223 A |
| 2015/0078913 A1* | 3/2015 | Enevoldsen | F03D 1/0633 | 416/241 R |
| 2015/0316025 A1* | 11/2015 | Enevoldsen | F03D 1/0633 | 416/237 |
| 2016/0312763 A1 | 10/2016 | Arce et al. | | |
| 2017/0045031 A1 | 2/2017 | Asheim et al. | | |
| 2017/0138340 A1* | 5/2017 | Asheim | F03D 1/0675 | |
| 2018/0142671 A1* | 5/2018 | Asheim | F03D 1/0675 | |
| 2018/0209398 A1* | 7/2018 | Wetzel | F03D 1/0675 | |
| 2018/0209401 A1* | 7/2018 | Herrig | F03D 1/0675 | |
| 2019/0113019 A1* | 4/2019 | Asheim | F03D 1/0641 | |

\* cited by examiner

WIND TURBINE BLADE COMPRISING A NOISE REDUCING DEVICE

This is a National Phase Application filed under 35 U.S.C. 371 as a national stage of PCT/EP2018/063379, filed May 22, 2018, an application claiming the benefit of European Application No. 17172212.7, filed May 22, 2017, the content of each of which is hereby incorporated by reference in its entirety.

TECHNICAL FIELD

The present invention relates to a noise reducing device for a wind turbine blade, having a first end, an opposite second end and opposite side surfaces arranged between the first and second ends, wherein the noise reducing device comprises a base part extending from the first end to a proximal end and an array of noise reducing elements extending from the proximal end to the second end.

The present invention further relates to a wind turbine blade with such a noise reducing device.

BACKGROUND

It is well-known that large wind turbine blades for modern wind turbines suffer from trailing edge noise generated by the airflow over the aerodynamic profile of the wind turbine blade. The airflow transforms from a substantially laminar airflow into a turbulent airflow over the respective side surface, and finally separates from the boundary layers at a separation point. This generates trailing edge vortices causing a wake effect and associated trailing edge noise of about one kilohertz (kHz).

It is known to integrate a noise reducing profile into the trailing edge of the wind turbine blade, such as disclosed in US 2011/018282 A1. However, this requires a mould with a uniquely designed mould surface or the use of additional mould elements to modify the profile of the mould surface. This increases the complexity of the lay-up process and adds extra steps to the manufacturing process.

Another way of solving this problem is to attach noise reducing devices at or near the trailing edge of the wind turbine blade. These devices often comprise noise reducing elements in the form of serrations projecting from a base plate. Various shapes and dimensions of these serrations have been proposed throughout the literature.

EP 3084209 A1 discloses such a wind turbine blade comprising a plate with flexible serrations arranged at the trailing edge. The serrations project from a base part of the plate having a plurality of vortex generators arranged on the side surface, wherein the vortex generators are deployed when the serrations bend relative to the base part.

The serrated plate is attached to the pressure or suction side of the wind turbine blade so that the serrations project freely from the trailing edge. The serrated plate has a straight leading edge profile projecting outwardly from the respective side surface due to the thickness of the base part. This forms an abrupt change in the airflow which leads to a loss in noise reduction performance at high frequencies and increased aerodynamic drag.

EP 2940293 A1 discloses a wind turbine blade with an aerodynamic device projecting from the suction side, wherein the device is connected to an attachment plate via intermediate spacer elements. The plate is attached to the suction side adjacent to the trailing edge of the wind turbine blade. The device has a serrated leading edge and a serrated trailing edge.

US 2012/0027590 A1 discloses a wind turbine blade with a trailing edge device comprising an array of rhomb shaped fins all projecting from the same side surface of a base plate. The array comprises a set of large fins and a set of small fins arranged in an alternating order along the base plate. Each of the large and small fins has a local length greater than the local width of the base plate so that both ends of each fin extend beyond the opposite edge surfaces of the base plate.

WO 2017/03966 A1 discloses a wind turbine blade with a blunt trailing edge, to which a device having a tab facing the pressure side and a plurality of turbulators facing the suction side is attached. The tab and turbulators extend parallel to each other in the longitudinal direction.

OBJECT OF THE INVENTION

An object of the invention is to provide a noise reducing device and a wind turbine blade that solves the abovementioned problems.

Another object of the invention is to provide a noise reducing device and a wind turbine blade that improves noise reduction performance at high frequencies.

Yet another object of the invention is to provide a noise reducing device and a wind turbine blade that reduces the aerodynamic drag.

DETAILED DESCRIPTION OF THE INVENTION

An object of the invention is achieved by a noise reducing device for a wind turbine blade, having a first end, a second end, a first local side surface and a second local side surface arranged between the first end and the second end, wherein the noise reducing device is configured for attachment to a side surface of the wind turbine blade, the noise reducing device comprising a plurality of a plurality of airflow modifying elements and a plurality of noise reducing elements, the airflow modifying elements extending from a first proximal end to the first end, the noise reducing elements extending from an opposite facing second proximal end to the second end, characterised in that the airflow modifying elements and the noise reducing elements extend in opposite longitudinal directions from the first end to the second end, said the airflow modifying elements are configured to contact or to be directly attached to said side surface of the wind turbine blade.

This provides a trailing edge device with improved noise reducing properties and reduced aerodynamic drag. This is achieved by altering the local leading edge profile of this noise reducing device, thereby modifying the airflow over the local leading edge of the noise reducing device. The present noise reducing device is suitable for use on wind turbine blades having a sharp trailing edge profile or a truncated trailing edge profile.

Integrating airflow modifying elements into the local leading edge of the noise reducing device allows the noise reduction performance to be increased compared to conventional noise reducing devices having a straight leading edge profile. Alternatively, the noise reducing device may be fitted with airflow modifying elements, which are positioned at the first proximal end.

The present noise reducing device extends in a longitudinal direction from the first end to the second end, and further in a transverse direction between a third end and a fourth end. The noise reducing device has a total length measured in longitudinal direction and a total width measured in the transverse direction. The total length and/or the total width may in example be adapted dependent on the aerodynamic profile and/or geometric dimensions of the wind turbine blade. This allows the noise reducing device to be adapted to a particular wind turbine blade.

According to one embodiment, the noise reducing device further comprising at least one base part, wherein said at least one base part extends from the first proximal end to the second proximal end.

The present noise reducing device may in a first example configuration comprise a base part which extends from the first proximal end to the second proximal end in the longitudinal direction, and further from the third end to the fourth end in the transverse direction. This base part may be configured to provide support for the noise reducing elements and/or the airflow modifying elements.

The base part and/or the airflow modifying elements may further be configured to be attached to the wind turbine blade. The base part and/or airflow modifying elements may be attached using an adhesive, fasteners (e.g. bolts, screws or rivets), or other attachments techniques. For example, an adhesive layer or an adhesive tape may be applied to the local first or second side surface of the base part and/or airflow modifying elements before or during attachment. The adhesive layer or tape may alternatively be applied to a matching contact surface on the wind turbine blade. Optionally, a removable cover layer may protect this adhesive layer prior to attachment. This allows for an easy attachment of the reducing device.

The base part may be formed by a single continuous element or at least two sub-elements which together forms the base part. During attachment, the individual sub-parts may simply be brought into contact with each other or interconnected via a mechanical coupling or by means of an adhesive. For example, the base part may comprise a first sub-part and a second sub-part each extending in the transverse direction.

This allows the airflow modifying elements and the noise reducing elements to be connected to individual base sub-parts. This further allows for separate manufacture of the airflow modifying elements and of the noise reducing elements.

According to a special embodiment, at least the airflow modifying elements or the noise reducing elements are integrally formed with the at least one base part.

The airflow modifying elements may be integrally formed with the base part, e.g. a first base sub-part as mentioned above. This allows for a firm connection and an optimal transfer of loads and stresses. This also allows the airflow modifying elements and the base part to be manufactured in a combined process, e.g. using casting or injection moulding, three-dimensional printing, extrusion using a light cured material or composite, or other suitable manufacturing techniques.

Additionally or alternatively, the noise reducing elements may be integrally formed with the base part, e.g. a second base sub-part as mentioned above. This further allows for a firm connection and an optimal transfer of loads and stresses. This also allows the noise reducing elements and the base part to be manufactured in a combined process, e.g. using casting or injection moulding, three-dimensional printing, extrusion using a light cured material or composite, or other suitable manufacturing techniques.

For example, both the airflow modifying elements and the noise reducing elements may be integrally formed with the base part to form a single piece. This allows loads and stresses to be directly transferred to the base part. This allows the noise reducing device to be manufactured in a single process, e.g. using casting or injection moulding, three-dimensional printing, extrusion using a light cured material or composite, or other suitable manufacturing techniques. This also reduces the number of installation steps and reduces the risk of errors during installation.

In an alternative configuration, the airflow modifying elements and/or the noise reducing elements may be separate elements which are arranged at the first proximal end and/or the second proximal end. These separate elements may simple contact the respective proximal end, or be attached to the respective proximal end, e.g. using an adhesive.

According to one embodiment, the first proximal end is substantially equal to the second proximal end.

In a second example configuration, the abovementioned base part may be omitted to form a compact noise reducing device. The airflow modifying elements and the noise reducing elements may thus substantially extend outwardly from a common proximal end. This saves material and weight.

According to a special embodiment, the airflow modifying elements are integrally formed with the noise reducing elements.

The airflow modifying elements and the noise reducing elements may in this second exemplary configuration be integrally formed to form a single piece. This allows loads and stresses to be directly transferred between the respective elements. This allows the noise reducing device to be manufactured in a single process, e.g. using casting or injection moulding.

In an alternative configuration, the airflow modifying elements and the noise reducing elements may be separate elements which are arranged to form the common proximal end. These separate elements may simple contact each other or be attached at the common proximal end, e.g. using an adhesive.

Arranging or integrating airflow modifying element into the local leading edge of the noise reducing device allows the local thickness of the base part or the common proximal end to be increased compared to conventional noise reducing devices having a straight leading edge. This further allows for an improved noise reduction performance.

According to one embodiment, each airflow modifying element has a first length measured from the first proximal end to the first end and each noise reducing element has a second length measured from the second proximal end to the second end, wherein the first length is equal to or less than the second length.

The airflow modifying elements and the base part may be arranged in substantially the same plane in the transverse direction. The airflow modifying elements and the base part may in example be shaped to form a flat plane or a curved plane, preferably shaped so that this plane substantially follows the surface contour of the wind turbine blade. This allows for a close fit between the noise reducing device and the wind turbine blade.

The noise reducing elements, in an unloaded state, may further be arranged in the same plane as the airflow modifying elements or base part. Alternatively, the noise reducing elements may be placed in an inclined angle relative to the plane of the airflow modifying elements or base part. This allows the noise reducing elements to be aligned with or bend relative to the opposite facing airflow modifying elements. The noise reducing elements may thus be adapted to the aerodynamic profile and/or geometric dimensions of a particular wind turbine blade so that the noise reducing elements are substantially aligned with the exiting airflow.

The individual noise reducing elements may all have a constant local length measured between the second proximal end and the second end, thereby forming a straight second end profile. The local length of the individual noise reducing elements may also vary, thereby forming a curved or wavy second end profile in the longitudinal direction and/or in the flapwise direction. This allows the point where the modified airflow exits the noise reducing elements to be adapted to the aerodynamic profile and/or geometric dimensions of a particular wind turbine blade.

Similarly, the individual airflow modifying elements may all have a constant local length measured between the first proximal end and the first end, thereby forming a straight first end profile. The local length of the individual airflow modifying elements may also vary, thereby forming a curved or wavy first end profile in the longitudinal direction. The relative depth over which the airflow modifying elements can influence the airflow may be adapted to the aerodynamic profile and/or geometric dimensions of a particular wind turbine blade. This may allow for a smoother airflow and/or surface pressure over this surface area, which in turn may reduce the surface pressure and/or the flow discontinuities, which normally lead to additional trailing edge noise.

For example, the airflow modifying elements and the noise reducing elements may have equal local lengths. Alternatively, the local length of the airflow modifying elements may be less than the local length of the noise reducing elements. For example, the local length of the airflow modifying elements may be between 30% to 70%, preferably between 40% to 60%, of the local length of the noise reducing elements. This allows for an individual adaption of the airflow modifying elements and the noise reducing elements.

According to one embodiment, each airflow modifying element has a first width measured along the first proximal end and each noise reducing element has a second width measured along the second proximal end, wherein the first width is equal to or less than the second width.

The individual noise reducing elements may furthermore all have a constant local width measured along the second proximal end. The local width of the individual noise reducing elements may also vary in the transverse direction. This allows the density of the noise reducing elements to be adapted to the aerodynamic profile and/or geometric dimensions of a particular wind turbine blade.

Similarly, the individual airflow modifying elements may all have a constant local width measured along the first proximal end. The local width of the individual airflow modifying elements may also vary in the transverse direction. This allows the density of the airflow modifying elements to be adapted to the aerodynamic profile and/or geometric dimensions of a particular wind turbine blade.

For example, the airflow modifying elements and the noise reducing elements may have equal local widths. Alternatively, the local width of the airflow modifying elements may be less than the local width of the noise reducing elements. This allows for an individual adaption of the airflow modifying elements and the noise reducing elements.

According to one embodiment, each airflow modifying element has a first profile and each noise reducing element has a second profile, wherein the first profile differs from the second profile.

The airflow modifying elements has a first profile seen in the longitudinal direction with at least one peripheral edge extending from the first proximal end towards the first end. The first profile further forms a local leading edge profile at the first end. The first profile may thus be adapted to the aerodynamic profile and/or geometric dimensions of a particular wind turbine blade to provide a modified airflow over the local leading edge of the noise reducing device.

Similarly, the noise reducing elements has a second profile seen in the longitudinal direction with at least one peripheral edge extending from the second proximal end towards the second end. The second profile further forms a local trailing edge profile at the second end. The second profile may thus be adapted to the aerodynamic profile and/or geometric dimensions of a particular wind turbine blade to provide optimal noise reduction properties.

The first profile may differ from the second profile so that the two profiles have different overall shapes. The first and/or second profile may in example have a triangular shape, a semi- or quarter-circular shape, a semi- or quarter-elliptical shape, an acute- or right-trapezoid shape or any other suitable shape. For example, the first profile may have a semi-circular profile and the second profile may have a triangular shape, or vice versa.

The first profile may also differ from the second profile by having the same overall shape, but different geometric properties. For example, the first profile may have an equilateral or isosceles triangular shape and the second profile may have a scalene or right-angled triangular shape, or vice versa.

The first and second profile may both have a central line extending perpendicularly from the respective proximal end and further through the respective local leading or trailing edge profile. The peripheral edges on both sides of this central line may have the same curvature. Alternatively, the peripheral edge on one side may have a different curvature than the peripheral edge on the other side. For example, the first or second profile may have a straight peripheral edge on one side and a convex or concave peripheral edge on the other side. For example, the first or second profile may have a convex peripheral edge on one side and a concave peripheral edge on the other side.

According to one embodiment, said first local side surface of at least the airflow modifying device has a tapered profile in a width direction and/or in a length direction.

The present noise reducing device may have a substantially flat side surface facing the respective side surface of the wind turbine blade. This allows for a substantially close fit to the blade side surface.

The present noise reducing device may further have a substantially flat side surface facing in the opposite direction. The noise reducing device may thus have a constant thickness seen in the longitudinal direction and/or in the transverse direction.

The side surface facing away from the side surface of the wind turbine blade may instead have a tapered profile in the longitudinal direction and/or in the transverse direction. For example, this tapered profile may taper in the longitudinal direction from the respective proximal end or an intermediate point towards the local leading or trailing edge profile. For example, this tapered profile may taper in the transverse direction from the central line towards one or both peripheral edges. This allows for a more optimal airflow over the airflow modifying elements or the noise reducing elements.

Optionally, this tapered profile may extend further along a portion of the base part located towards the airflow modifying elements or the noise reducing elements. For example, the tapered profile may taper from a central line of the base part towards the peripheral edge of the airflow modifying elements or the noise reducing elements. This allows for a reduced tapered angle in the longitudinal direction. This also allows for a more optimal airflow over the noise reducing device.

According to a preferred embodiment, at least the airflow modifying elements are serrations.

The airflow modifying elements may advantageously be configured as serrations having a first profile as described earlier. The noise reducing device may thus comprise an array of first serrations extending along the first end. An intermediate gap may be formed between two adjacent first serrations.

According to a further preferred embodiment, the noise reducing elements are serrations.

Additionally, the noise reducing elements may also be configured as serrations having a second profile as described earlier. The noise reducing device may further comprise an array of second serrations extending along the second end. An intermediate gap may be formed between two adjacent second serrations.

The first and second serrations may be aligned with each other or offset relative to each other in the transverse direction.

The base part, the airflow modifying elements and/or the noise reducing elements may be made of a flexible material, such as thermoplastics, composite materials, polymer, rubber, PUR or other suitable materials or composites. This allows the respective serrations to flex or bend when subjected to wind loads or to follow the deformation of the wind turbine blade. Alternatively, the base part and/or the noise reducing elements may be made of a rigid material, such as metals (e.g. steel) or glass or carbon fibre reinforced materials or composites. This reduces the fluttering of the second serrations during operations. Other materials or composites may also be used.

An object of the invention is also achieved by a wind turbine blade for a wind turbine, extending in a longitudinal direction from a blade root to a tip end and further in a chordwise direction from a leading edge to a trailing edge, the wind turbine blade comprising a first side surface defining a pressure side and a second side surface defining a suction side, wherein at least one noise reducing device is attached to one of said first and second side surfaces, the at least one noise reducing device is arranged relative to the trailing edge, characterised in that said at least one noise reducing device is configured as described above.

This provides a wind turbine blade fitted with one or more noise reducing devices for improved noise reduction performance. For example, a 1 dB noise reduction by the present noise reducing device allows for 1% to 1.5% higher annual energy production (AEP).

The wind turbine blade extends in a longitudinal or spanwise direction between the blade root and the tip end and further in a transverse or chordwise direction between a leading edge and a trailing edge. The wind turbine blade has a pressure side defined by a first side surface and a suction side defined by a second side surface, wherein the present noise reducing devices are arranged on the pressure or side.

An array of noise reducing devices may be arranged on the pressure or suction side and extend along the trailing edge. The individual noise reducing devices of the array may be spaced apart or contacting each other. The noise reducing device or array of noise reducing devices may be arranged on the aerodynamic portion of the wind turbine blade. For example, between 33% and 100% of the blade length measured from the blade root, e.g. between 66% and 100% of the blade length measured from the blade root.

According to one embodiment, at least the airflow modifying elements or at least one base part of the at least one noise reducing device is arranged on said one of the first and second side surfaces and extends towards the leading edge.

At least the base part or the airflow modifying elements may be attached directly to the respective side surface of the wind turbine blade. Alternatively, both the base part and the airflow modifying elements may be attached directly to the side surface of the wind turbine blade. This increases the area of attachment and thus allows for an improved attachment.

In example, only the base part may be used to attach the noise reducing device while the airflow modifying element simply contacts the respective side surface of the wind turbine blade. If the airflow modifying elements have side surface, e.g. a local pressure or suction side, with a tapered profile, then the modified airflow may push the airflow modifying elements against the wind turbine blade. This allows for a close contact between the wind turbine blade and the noise reducing device.

Due to the airflow modifying elements located at the local leading edge, e.g. the first proximal end, the local thickness of the noise reducing device can be increased without increasing the drag and the loss of noise reduction performance. The local thickness is measured at the base part or at the common proximal end and between the local side surfaces.

According to one embodiment, the trailing edge is a truncated trailing edge having a trailing edge surface, wherein the noise reducing elements or at least one base part of the at least one noise reducing device extend along at least part of said trailing edge surface in a flapwise direction.

The present noise reducing device may suitably be attached to a wind turbine blade having a sharp or truncated trailing edge profile. The truncated trailing edge profile may further comprise a trailing edge surface extending in a flapwise direction and further in the longitudinal direction.

The second proximal end or common proximal end may be arranged relative to this sharp trailing edge or trailing edge surface. For example, the second proximal end or common proximal end may be aligned with the sharp trailing edge or trailing edge surface so that the entire noise reducing elements project freely from the trailing edge of the wind turbine blade. For example, the second proximal end or common proximal end may be placed in a retracted position relative to the sharp trailing edge or trailing edge surface so that only a part of the noise reducing elements extend freely from the trailing edge of the wind turbine blade.

The base part may comprise one or more optional thickened portions projecting from one local side surface. The thickened portion(s) may be arranged at or near the second proximal end and extend towards the first proximal end in the longitudinal direction. The thickened portion may further extend partly or fully along said one local side surface in the transverse direction. The thickened portion may have a local edge surface facing the first end of the noise reducing device. The local edge surface may have a surface profile, e.g. a flat surface profile, adapted to follow the profile of the trailing edge surface.

Alternatively, the thickened portion may extend partly or fully along the base part and further along the noise reducing element in the longitudinal direction. This allows the thickened portion to add extra support to the respective noise reducing element.

Alternatively, the thickened portion may be arranged on the noise reducing element instead, wherein the local edge surface is arranged at or near the second proximal end. This also allows the noise reducing elements to be shaped as a cone or pyramid shaped element.

The abovementioned thickened portions may act as stop blocks during attachment, wherein the stop blocks are brought into contact with the trailing edge of the wind turbine blade in order to correctly align the noise reducing device. This configuration is particularly suited for attachment to wind turbine blades having truncated trailing edges.

DESCRIPTION OF DRAWINGS

The invention is explained in detail below with reference to embodiments shown in the drawings, in which.

LIST OF REFERENCES

Figure 1:
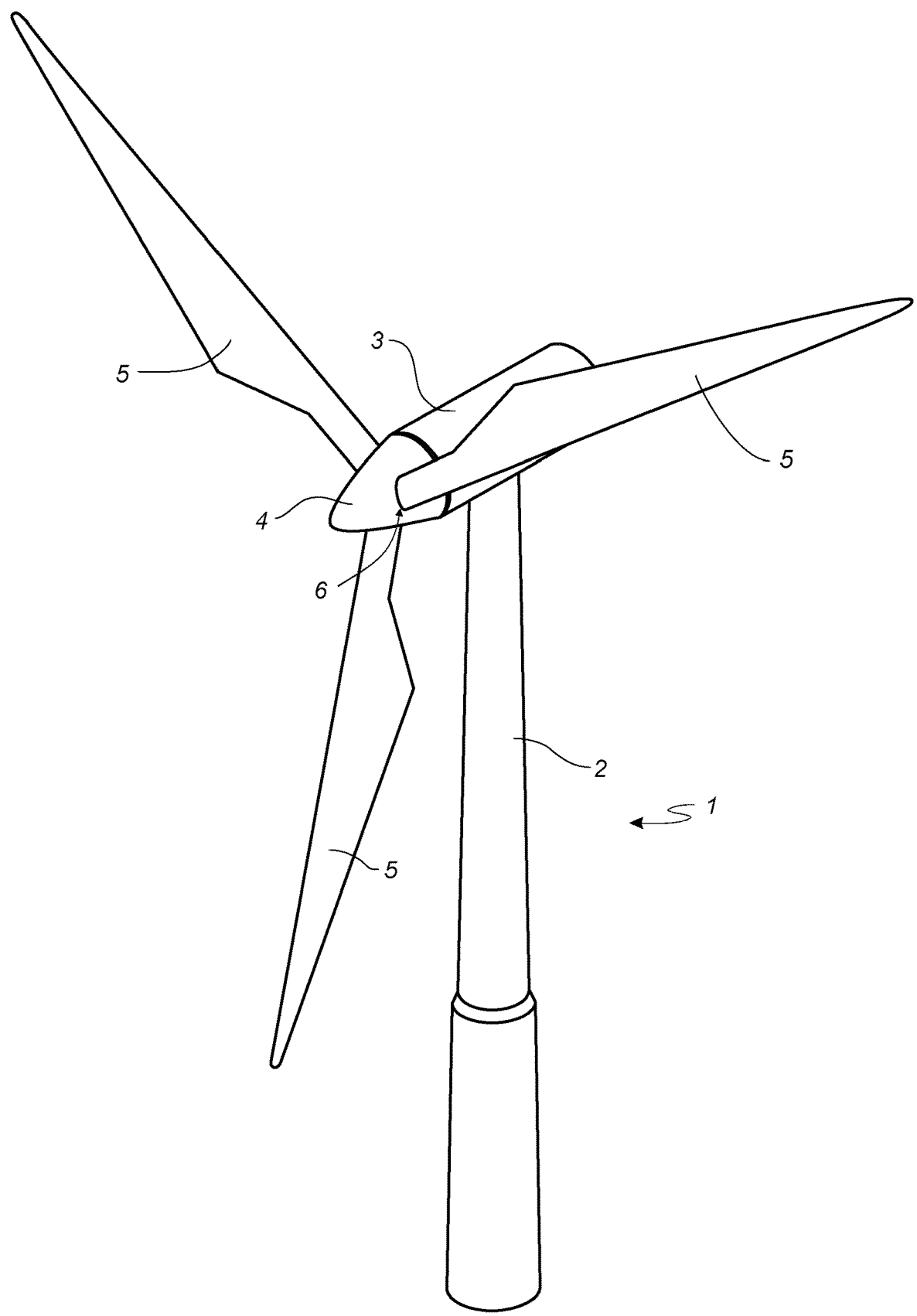
FIG. 1 shows a wind turbine.

1. Wind turbine
2. Wind turbine tower
3. Nacelle
4. Hub
5. Wind turbine blades
6. Pitch bearing
7. Blade root
8. Tip end
9. Leading edge
10. Trailing edge
11. Blade shell
12. Pressure side
13. Suction side
14. Blade root portion
15. Aerodynamic blade portion
16. Transition portion
17. Length of wind turbine blade
18. Chord length of wind turbine blade
19. Noise reducing device
20. Airflow modifying elements
21. First proximal end
22. First end
23. Noise reducing elements
24. Second proximal end
25. Second end
26. Base part
27. First local side surface
28. Local edge surface
29. Second local side surface
30. Central line
31. Peripheral edges
32. Trailing edge surface The listed reference numbers are shown in abovementioned drawings where no all reference numbers are shown on the same figure for illustrative purposes. The same part or position seen in the drawings will be numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2, e.g. via a yaw bearing unit. The rotor comprises a hub 4 and a number of wind turbine blades 5. Here three wind turbine blades are shown, but the rotor may comprise more or fewer wind turbine blades 5. The hub 4 is connected to a drive train, e.g. a generator, located in the wind turbine 1 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
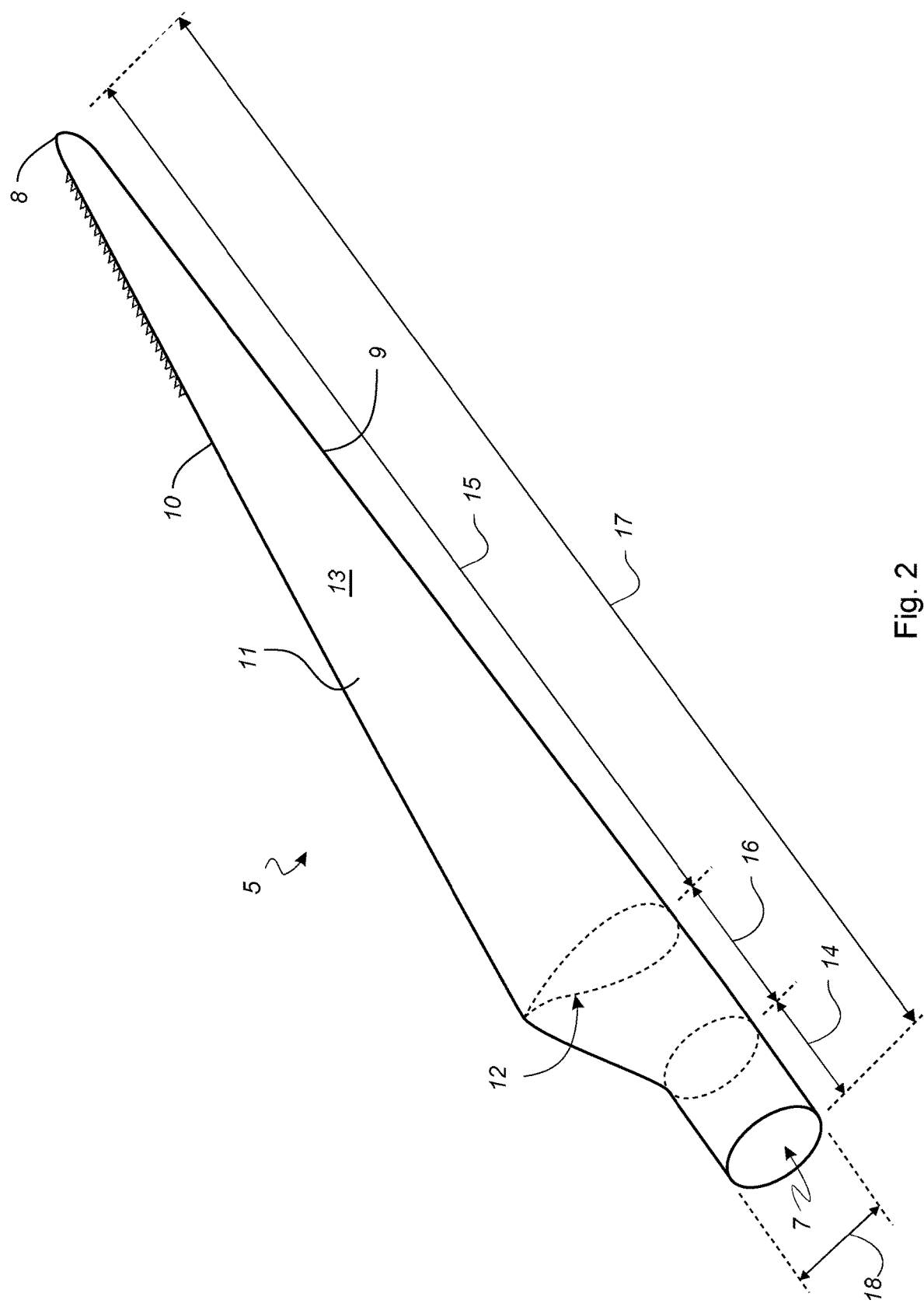
FIG. 2 shows an exemplary embodiment of the wind turbine blade.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade 5 comprises a blade shell 11 having two opposite facing side surfaces defining a pressure side 12 and a suction side 13 respectively. The blade shell 11 further defines a blade root portion 14, an aerodynamic blade portion 15, and a transition portion 16 between the blade root portion 14 and the aerodynamic blade portion 15.

The blade root portion 14 has a substantially circular or elliptical cross-section (indicated by dashed lines). The blade root portion 14 together with a load carrying structure, e.g. a main laminate combined with a shear web or a box beam, are configured to add structural strength to the wind turbine blade 5 and transfer the dynamic loads to the hub 4. The load carrying structure extends between the pressure side 12 and the suction side 13 and further in the longitudinal direction.

The blade aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition portion 16.

The wind turbine blade 5 has a longitudinal length 17 of at least 35 metres, preferably at least 50 metres. The wind turbine blade 5 further has a chord length 18 as function of the length 17, wherein the maximum chord length is found between the blade aerodynamic blade portion 15 and the transition portion 16.

Figure 3:
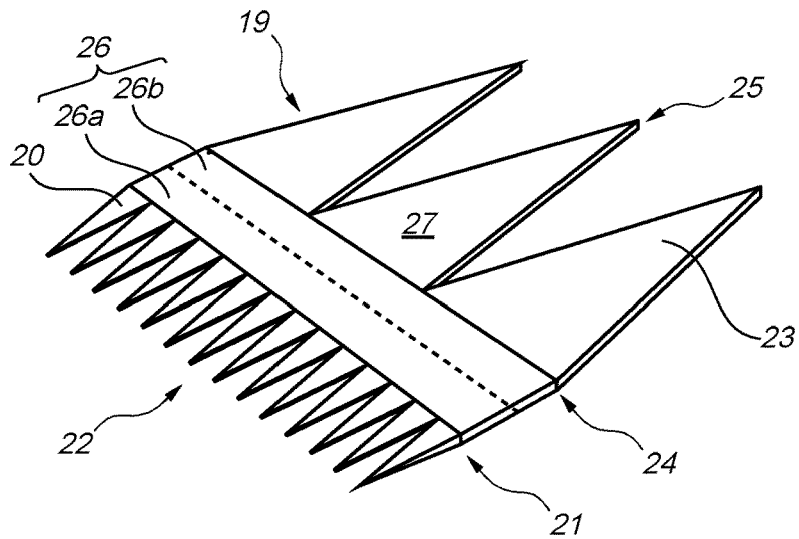
FIG. 3 shows a first exemplary embodiment of the noise reducing device.

FIG. 3 shows a first exemplary embodiment of a noise reducing device 19 configured for attachment to the wind turbine blade 5. An array of noise reducing devices 19 is optionally arranged on the wind turbine blade 5 along the trailing edge 10, as indicated in FIG. 2.

The noise reducing device 19 comprises a plurality of airflow modifying elements 20 having a first profile which extends from a first proximal end 21 to a first end 22. The noise reducing device 19 further comprises a plurality of noise reducing elements 23 having a second profile which extends from a second proximal end 24 to a second end 25. The airflow modifying elements 20 and the noise reducing elements 23 face in opposite longitudinal directions.

Figure 8:
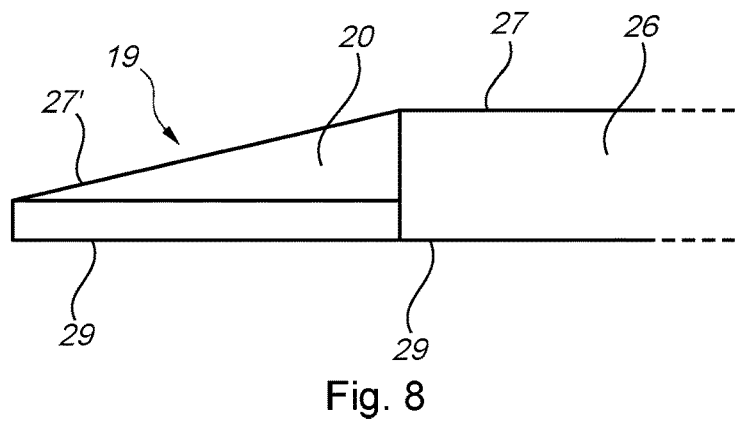
FIG. 8 shows a first embodiment of the airflow modifying elements.
Figure 9:
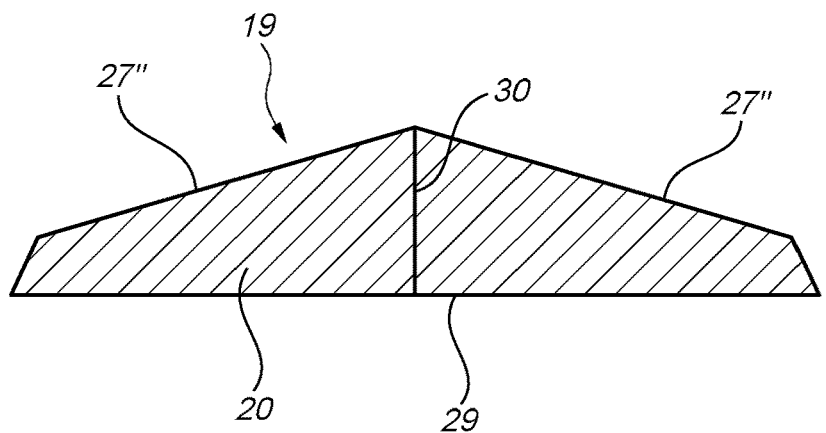
FIG. 9 shows a second embodiment of the airflow modifying elements.

The airflow modifying elements 20, the base part 26 and the noise reducing elements 23 has first local side surface 27 and an opposite second side surface (see FIGS. 8 and 9). Here both the first and second local side surfaces form a continuous side surface.

Figure 4:
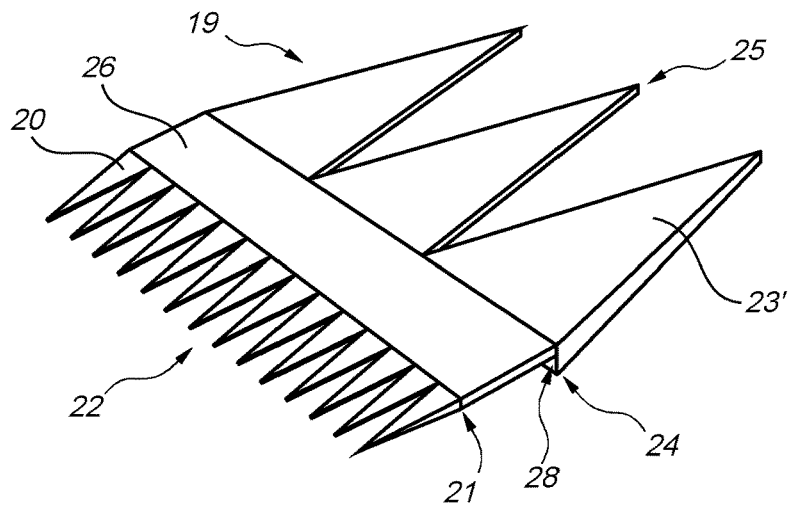
FIG. 4 shows a second exemplary embodiment of the noise reducing device.
Figure 5:
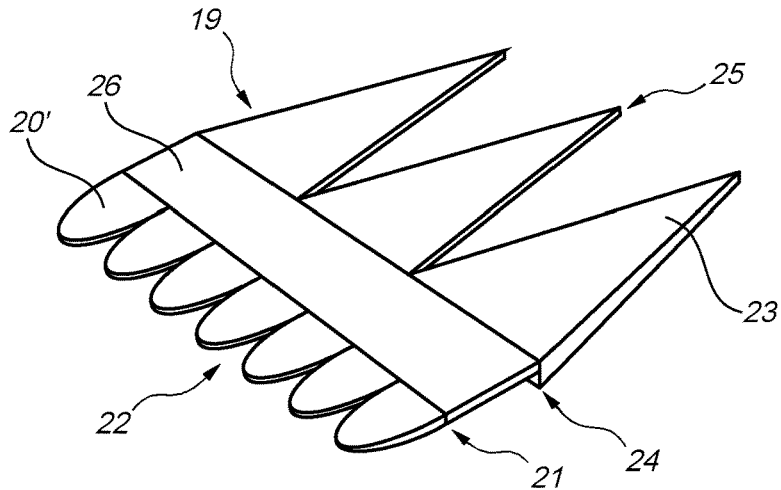
FIG. 5 shows a third exemplary embodiment of the noise reducing device.

A base part 26 is arranged between the first and second proximal ends 21, 24 and extends in a transverse direction. The base part 26 is formed by a single continuous element, as indicated in FIGS. 4 and 5. Alternatively, the base part 26 is formed by a first sub-part 26a and at least a second sub-part 26b, as indicated in FIG. 3.

Here, the airflow modifying elements 20 and the noise reducing elements 23 are shaped as serrations having the same overall triangular profile. The airflow modifying elements 20 have a first local length and the noise reducing elements 23 have a second local length. As illustrated in FIG. 3, the first local length is less than the second local length, e.g. less than 50% of the second local length. The airflow modifying elements 20 further have a first local width and the noise reducing elements 23 further have a second local width. As illustrated in FIG. 3, the first local width is less than the second local width, e.g. less than 33% of the second local width.

FIG. 4 shows a second exemplary embodiment of the noise reducing device 19 where the noise reducing elements 23' have a different profile than the noise reducing elements 23.

The noise reducing elements 23' comprises a thickened portion arranged on the second local side surface, wherein this thickened portion tapers from the second proximal end 24 to the second end 25. The thickened portion has a local edge surface 28 facing the first end 22.

Here, the noise reducing elements 23' has a substantially three-dimensional pyramid-shaped profile. The noise reducing elements 23 in FIG. 3 has a substantially two-dimensional pyramid-shaped profile.

FIG. 5 shows a third exemplary embodiment of the noise reducing device 19 where the airflow modifying elements 20' have a different profile than the noise reducing elements 23. Here, the noise reducing elements 23 have a triangular profile while the airflow modifying elements 20' have a semi-elliptical profile.

Figure 6:
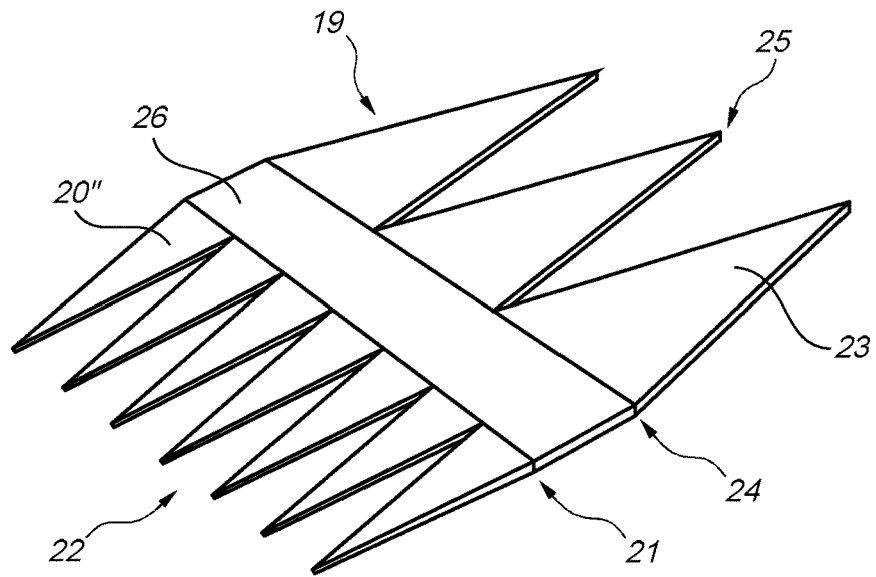
FIG. 6 shows a fourth exemplary embodiment of the noise reducing device.

FIG. 6 shows a fourth exemplary embodiment of the noise reducing device 19 where the airflow modifying elements 20" have different geometrical properties than the airflow modifying elements 20 of FIG. 3.

Here, the first local length is less than the second local length, e.g. between 50% to 100% of the second local length. The first local width is less than the second local width, e.g. between 33% to 100% of the second local width. The first local width may further be between 50% to 100% of the second local width, as indicated in FIG. 7.

Figure 7:
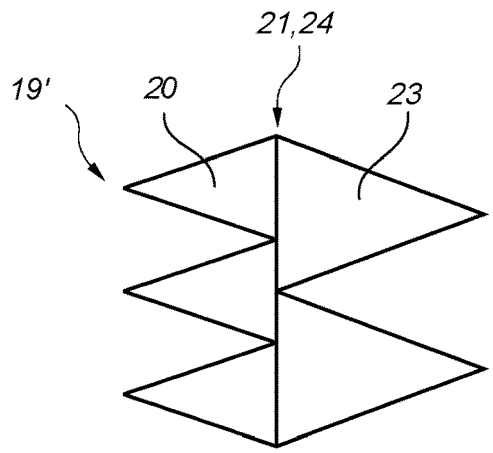
FIG. 7 shows a fifth exemplary embodiment of the noise reducing device.

FIG. 7 shows a fifth exemplary embodiment of the noise reducing device 19' where the base part 26 is omitted. Here, the first and second proximal ends 21, 24 form a common proximal end.

Figure 10:
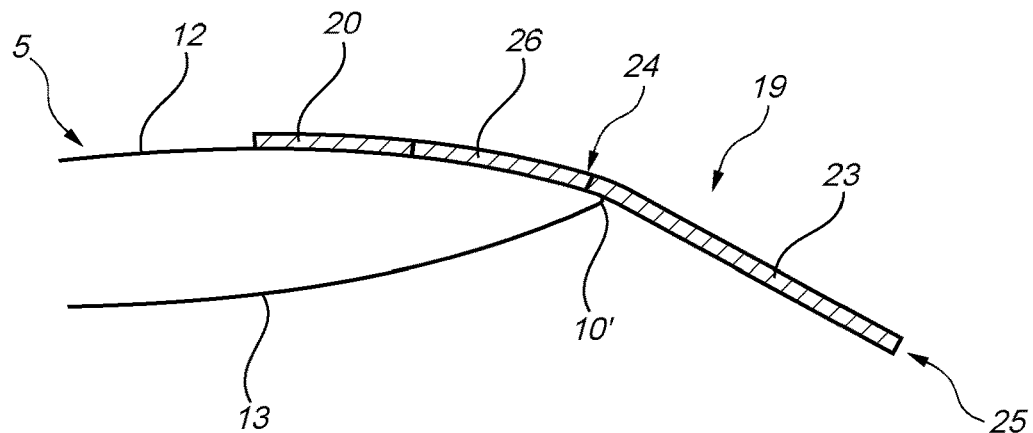
FIG. 10 shows a cross-sectional view of the noise reducing device attached to the wind turbine blade with a sharp trailing edge.
Figure 11:
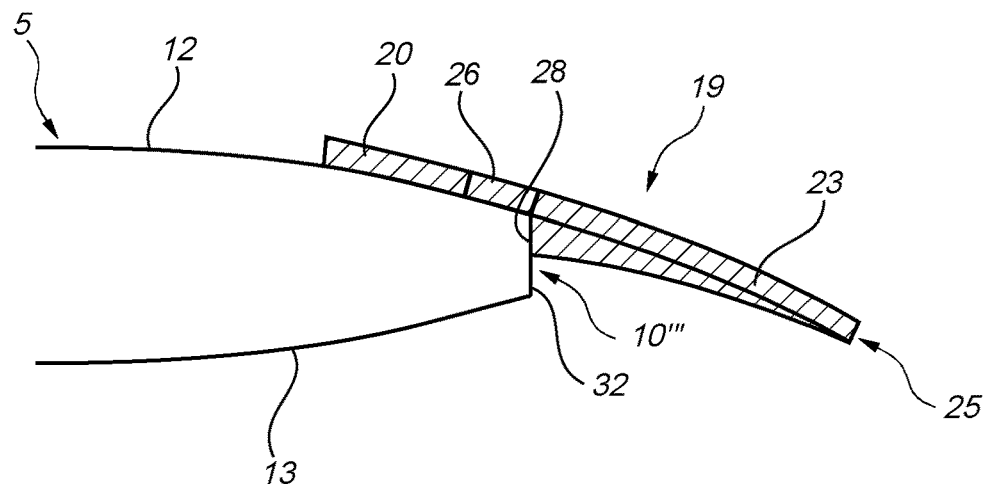
FIG. 11 shows a cross-sectional view of the noise reducing device attached to the wind turbine blade with a sharp trailing edge.

FIG. 8 shows a first embodiment of the airflow modifying elements 20 seen in the transverse direction. The second local side surface 29 of at least the airflow modifying elements 20 and the base part 26 form a flat side surface facing the respective side surface of the wind turbine blade 5 when attached, as illustrated in FIGS. 10 and 11. The first local side surfaces 27' of the airflow modifying elements 20 and the base part 26 face in an opposite flapwise direction when attached.

The first local side surface 27' of at least the airflow modifying elements 20 has a tapered profile in the longitudinal direction, which tapers from the first proximal end 21 to the first end 22.

FIG. 9 shows a second embodiment of the airflow modifying elements 20 wherein the first local side surface 27" of at least the airflow modifying elements 20 has a tapered profile in the transverse direction. The first local side surface 27" tapers from a central line 30 to the opposite peripheral edges 31 of the airflow modifying elements 20.

Optionally, the first local side surface 27 of the airflow modifying elements 20 has a 30 combined tapered profile which tapers in both the longitudinal direction and the transverse direction.

FIG. 10 shows a cross-sectional view of the noise reducing device 19 attached to the wind turbine blade 5. Here, the wind turbine blade 5 has a sharp trailing edge 10'. The 35 airflow modifying elements 20 and the base part 26 are arranged on the pressure side 12, alternatively on the suction side 13, of the wind turbine blade 5. The airflow modifying elements 20 and/or the base part 26 are/is attached to the respective side surface of the wind turbine blade 5.

The second proximal end 24 is placed in a retracted position relative to, alternatively aligned with, the sharp trailing edge 10'. The noise reducing elements 23 thus project freely from the trailing edge 10' so that the second end 25 is located behind the trailing edge 10'.

FIG. 11 shows a cross-sectional view of the noise reducing device 19 attached to the wind turbine blade 5 with a truncated trailing edge 10". The truncated trailing edge 10" has a trailing edge surface 32 facing the second end 25 of the noise reducing device 19.

Here, the thickened portion of the noise reducing elements 23 is arranged relative to this truncated trailing edge 10" so that the local edge surface 28 is contacting the trailing edge surface 32. Alternatively, the thickened portion is further attached to the truncated trailing edge 10", e.g. using an adhesive between the local edge surface 28 and the trailing edge surface 32.

The abovementioned embodiments may be combined in any combinations without deviating from the present invention.

The invention claimed is:

1. A noise reducing device (19) for a wind turbine blade (5), having a first end (22), a second end (25), a first local side surface (27) and a second local side surface (29) arranged between the first end (22) and the second end, wherein the noise reducing device (19) is configured for attachment to a side surface of the wind turbine blade (5), the noise reducing device (19) comprising a plurality of airflow modifying elements (20), a plurality of noise reducing elements (23) and at least one base part (26), the airflow modifying elements (20) extending from a first proximal end (21) to the first end (22), the noise reducing elements (23) extending from an opposite facing second proximal end (24) to the second end (25), and the at least one base part (26) extending from the first proximal end (21) to the second proximal end (24), wherein the airflow modifying elements (20) and the noise reducing elements (23) extend in opposite longitudinal directions from the first end (22) to the second end (25), the second local side surface (29) of each of the airflow modifying elements (20) and the at least one base part (26) forming a continuous flat side surface and being configured to contact and/or to be directly attached to said side surface of the wind turbine blade (5), the noise reducing device (19) being further configured to be arranged relative to a trailing edge (10) of the wind turbine blade (5), the trailing edge (10) being a truncated trailing edge (10"), and wherein the noise reducing device (19) has a local edge surface (28) facing the first end (22).

2. The noise reducing device according to claim 1, wherein at least the airflow modifying elements (20) or the noise reducing elements (23) are integrally formed with the at least one base part (26).

3. The noise reducing device according to claim 1, wherein each of the airflow modifying elements (20) has a first length measured from the first proximal end (21) to the first end (22) and each of the noise reducing elements (23) has a second length measured from the second proximal end (24) to the second end (25), wherein the first length is equal to or less than the second length.

4. The noise reducing device according to claim 1, wherein each of the airflow modifying elements (20) has a first width measured along the first proximal end (21) and each of the noise reducing elements (23) has a second width measured along the second proximal end (24), wherein the first width is equal to or less than the second width.

5. The noise reducing device according to claim 1, wherein each of the airflow modifying elements (20) has a first profile and each of the noise reducing elements (23) has a second profile, wherein the first profile differs from the second profile.

6. The noise reducing device according to claim 1, wherein said first local side surface (27) of at least the airflow modifying elements (20) has a tapered profile in a width direction and/or in a length direction.

7. The noise reducing device according to claim 1, wherein at least the airflow modifying elements (20) are serrations.

8. The noise reducing device according to claim 7, wherein the noise reducing elements (23) are serrations.

9. A wind turbine blade (5) for a wind turbine, extending in a longitudinal direction from a blade root (7) to a tip end (8) and further in a chordwise direction from a leading edge (9) to a trailing edge (10), the wind turbine blade comprising a first side surface defining a pressure side (12) and a second side surface defining a suction side (13), wherein at least one noise reducing device (19) according to claim 1 is attached to one of said first and second side surfaces, wherein the at least one noise reducing device (19) is arranged relative to the trailing edge (10), the trailing edge (10) being a truncated trailing edge (10").

10. The wind turbine blade according to claim 9, wherein at least the airflow modifying elements (20) or the at least one base part (26) of the at least one noise reducing device (19) is arranged on said one of the first and second side surfaces and extends towards the leading edge (9).

11. The wind turbine blade according to claim 9, wherein the truncated trailing edge (10") includes a trailing edge surface (32), and wherein the local edge surface (28) of the at least one noise reducing device (19) extends along at least part of said trailing edge surface (32) in a flapwise direction.

12. The noise reducing device according to claim 1, wherein the local edge surface is arranged at or adjacent to the second proximal end (24).

13. A noise reducing device (19) for a wind turbine blade (5), having a first end (22), a second end (25), a first local side surface (27) and a second local side surface (29) arranged between the first end (22) and the second end, wherein the noise reducing device (19) is configured for attachment to a side surface of the wind turbine blade (5), the noise reducing device (19) comprising a plurality of airflow modifying elements (20), a plurality of noise reducing elements (23) and at least one base part (26), the airflow modifying elements (20) extending from a first proximal end (21) to the first end (22), the noise reducing elements (23) extending from an opposite facing second proximal end (24) to the second end (25), and the at least one base part (26) extending from the first proximal end (21) to the second proximal end (24), wherein the airflow modifying elements (20) and the noise reducing elements (23) extend in opposite longitudinal directions from the first end (22) to the second end (25), the second local side surface (29) of each of the airflow modifying elements (20) and the at least one base part (26) forming a continuous flat side surface and being configured to contact and/or to be directly attached to said side surface of the wind turbine blade (5), wherein the wind turbine blade (5) has a trailing edge (10), the trailing edge (10) being a truncated trailing edge (10") having a trailing edge surface (32), and wherein the at least one noise reducing device (19) has a local edge surface (28) configured to extend along at least part of said trailing edge surface (32) in a flapwise direction when the noise reducing device (19) is attached to a side surface of the wind turbine blade (5).

14. The noise reducing device according to claim 13, wherein each of the airflow modifying elements (20) has a first length measured from the first proximal end (21) to the first end (22) and each of the noise reducing elements (23) has a second length measured from the second proximal end (24) to the second end (25), wherein the first length is equal to or less than the second length.

15. The noise reducing device according to claim 13, wherein each of the airflow modifying elements (20) has a first width measured along the first proximal end (21) and each of the noise reducing elements (23) has a second width measured along the second proximal end (24), wherein the first width is equal to or less than the second width.

16. The noise reducing device according to claim 13, wherein said first local side surface (27) of at least the airflow modifying elements (20) has a tapered profile in a width direction and/or in a length direction.

17. A wind turbine blade (5) for a wind turbine, extending in a longitudinal direction from a blade root (7) to a tip end (8) and further in a chordwise direction from a leading edge (9) to a trailing edge (10), the wind turbine blade comprising a first side surface defining a pressure side (12) and a second side surface defining a suction side (13), wherein at least one noise reducing device (19) is attached to one of said first and second side surfaces, wherein the at least one noise reducing device (19) is arranged relative to the trailing edge (10), the noise reducing device (19) having a first end (22), a second end (25), a first local side surface (27) and a second local side surface (29) arranged between the first end (22) and the second end, the noise reducing device (19) comprising a plurality of airflow modifying elements (20), a plurality of noise reducing elements (23) and at least one base part (26), the airflow modifying elements (20) extending from a first proximal end (21) to the first end (22), the noise reducing elements (23) extending from an opposite facing second proximal end (24) to the second end (25), the at least one base part (26) extends from the first proximal end (21) to the second proximal end (24), wherein the airflow modifying elements (20) and the noise reducing elements (23) extend in opposite longitudinal directions from the first end (22) to the second end (25), the second local side surface (29) of each of the airflow modifying elements (20) and the at least one base part (26) forming a continuous flat side surface, wherein the trailing edge (10) is a truncated trailing edge (10") having a trailing edge surface (32), wherein the at least one noise reducing device (19) has a local edge surface (28) extend along at least part of said trailing edge surface (32) in a flapwise direction.

18. The wind turbine blade according to claim 17, wherein each of the airflow modifying elements (20) has a first length measured from the first proximal end (21) to the first end (22) and each of the noise reducing elements (23) has a second length measured from the second proximal end (24) to the second end (25), wherein the first length is equal to or less than the second length.

19. The wind turbine blade according to claim 17, wherein each of the airflow modifying elements (20) has a first width measured along the first proximal end (21) and each of the noise reducing elements (23) has a second width measured along the second proximal end (24), wherein the first width is equal to or less than the second width.

20. The wind turbine blade according to claim 17, wherein said first local side surface (27) of at least the airflow modifying elements (20) has a tapered profile in a width direction and/or in a length direction.

* * * * *